US012645272B2

(12) United States Patent
Arimilli et al.

(10) Patent No.: US 12,645,272 B2
(45) Date of Patent: Jun. 2, 2026

(54) PROCESSOR CLUSTER CONFIGURED TO MAXIMIZE UTILIZATION OF A PROCESSOR CORE ELECTRICALLY COUPLED DIRECTLY TO A POWER SOURCE AND RELATED METHODS

(71) Applicant: QUALCOMM Incorporated, San Diego, CA (US)

(72) Inventors: Rajesh Arimilli, Bangalore (IN); Bharat Kumar Rangarajan, Bangalore (IN); Raashid Moin Shaikh, Bangalore (IN); Venkata Biswanath Devarasetty, Hyderabad (IN); Ramakrishna Gottimukkula, Hyderabad (IN); Rohit Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 18/523,352

(22) Filed: Nov. 29, 2023

(65) Prior Publication Data

US 2025/0172980 A1     May 29, 2025

(51) Int. Cl.
G06F 1/26      (2006.01)
G06F 1/3287    (2019.01)
G06F 1/329     (2019.01)
G06F 9/48      (2006.01)

(52) U.S. Cl.
CPC .............. *G06F 1/26* (2013.01); *G06F 1/3287* (2013.01); *G06F 1/329* (2013.01); *G06F 9/485* (2013.01)

(58) Field of Classification Search
CPC .......... G06F 1/26; G06F 1/3287; G06F 1/329; G06F 9/485

USPC ................................. 713/300, 324; 718/100
See application file for complete search history.

(56) References Cited

U.S. PATENT DOCUMENTS

| | | | | |
|---|---|---|---|---|
| 8,261,285 B2 * | 9/2012 | Felter | ................... | G06F 9/5094 |
| | | | | 719/310 |
| 9,075,588 B2 * | 7/2015 | Dathe | ....................... | G06F 1/26 |
| 11,681,311 B2 * | 6/2023 | Inagaki | ................ | G06F 1/3206 |
| | | | | 713/340 |
| 2008/0276026 A1 * | 11/2008 | Branover | .............. | G06F 1/3203 |
| | | | | 710/260 |

(Continued)

OTHER PUBLICATIONS

International Search Report and Written Opinion for International Patent Application No. PCT/US2024/051938, mailed Dec. 11, 2024, 15 pages.

*Primary Examiner* — Ji H Bae
(74) *Attorney, Agent, or Firm* — W&T

(57)                    ABSTRACT

A processor cluster includes a first processor core electrically coupled directly to a power rail and a second processor core coupled to the power rail through power switches. The first processor core consumes power due to leakage currents during idle states. The second processor core is electrically decoupled from the power rail during idle states by the power switches, but the power switches cause a performance degradation. A scheduler assigns tasks to the first processor core rather than the second processor core to maximize performance and minimize power consumption due to leakage currents. Some tasks may indicate that they can be executed on a lower-performance core type, which may be the core type of the second processor core, but those tasks may be assigned to the first processor core while the second processor core is turned off.

20 Claims, 6 Drawing Sheets

(56) References Cited

U.S. PATENT DOCUMENTS

| | | | |
|---|---|---|---|
| 2009/0001814 A1* | 1/2009 | Subramaniam | G06F 1/3287 |
| | | | 307/39 |
| 2010/0138684 A1* | 6/2010 | Kim | G06F 1/3225 |
| | | | 713/600 |
| 2012/0260258 A1 | 10/2012 | Regini et al. | |
| 2013/0339977 A1* | 12/2013 | Dennis | G06F 9/5088 |
| | | | 718/105 |
| 2015/0121105 A1 | 4/2015 | Ahn et al. | |
| 2015/0346001 A1* | 12/2015 | Tripathi | B60P 1/433 |
| | | | 702/190 |
| 2019/0370130 A1* | 12/2019 | Meriac | G06F 11/1604 |
| 2022/0391250 A1* | 12/2022 | Browne | G06F 9/45558 |
| 2024/0134619 A1* | 4/2024 | Montero | G06F 1/26 |
| 2024/0200980 A1* | 6/2024 | Poli | G06F 1/3287 |

* cited by examiner

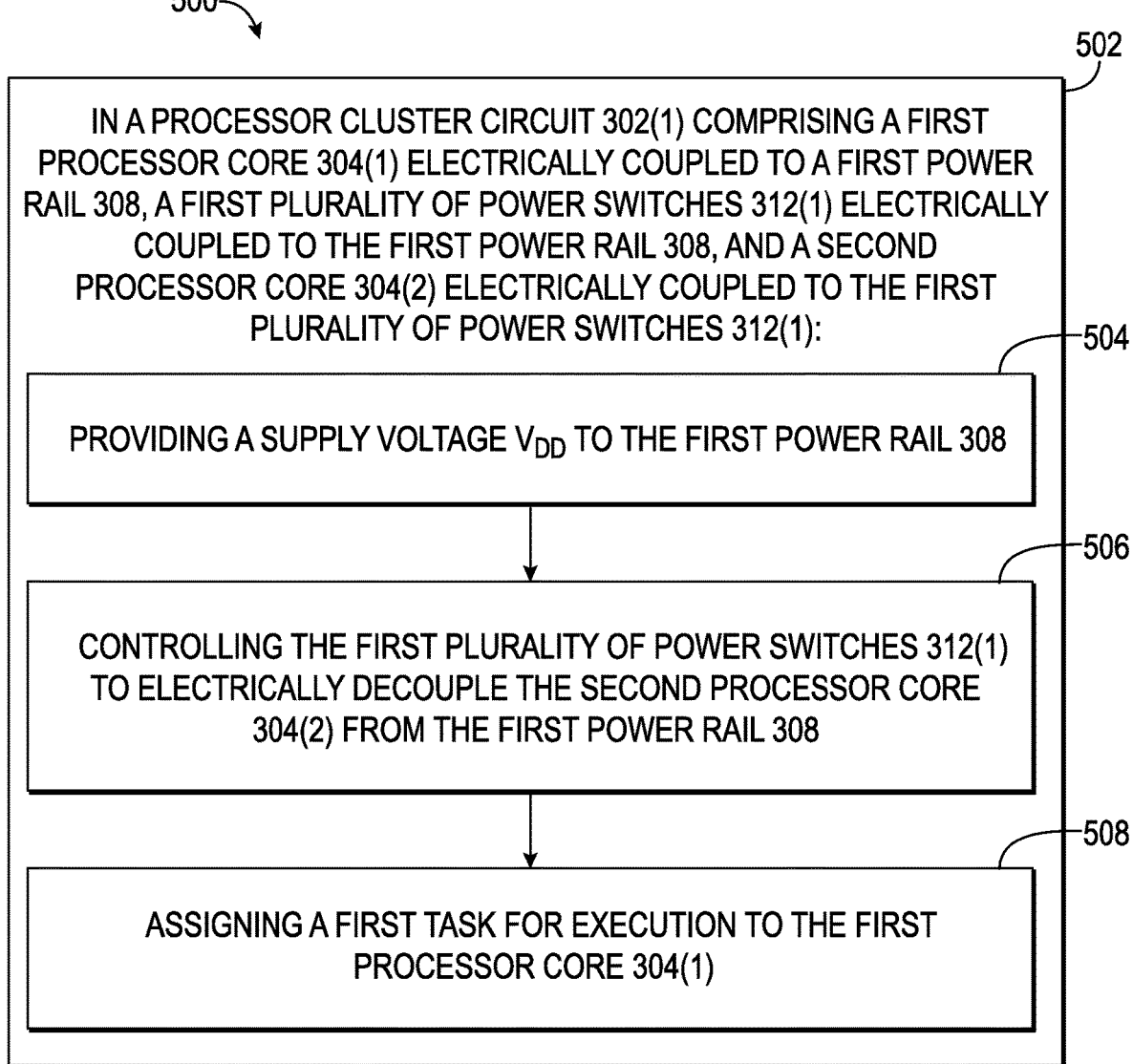

500

502

IN A PROCESSOR CLUSTER CIRCUIT 302(1) COMPRISING A FIRST PROCESSOR CORE 304(1) ELECTRICALLY COUPLED TO A FIRST POWER RAIL 308, A FIRST PLURALITY OF POWER SWITCHES 312(1) ELECTRICALLY COUPLED TO THE FIRST POWER RAIL 308, AND A SECOND PROCESSOR CORE 304(2) ELECTRICALLY COUPLED TO THE FIRST PLURALITY OF POWER SWITCHES 312(1):

504

PROVIDING A SUPPLY VOLTAGE $V_{DD}$ TO THE FIRST POWER RAIL 308

506

CONTROLLING THE FIRST PLURALITY OF POWER SWITCHES 312(1) TO ELECTRICALLY DECOUPLE THE SECOND PROCESSOR CORE 304(2) FROM THE FIRST POWER RAIL 308

508

ASSIGNING A FIRST TASK FOR EXECUTION TO THE FIRST PROCESSOR CORE 304(1)

FIG. 5

PROCESSOR CLUSTER CONFIGURED TO MAXIMIZE UTILIZATION OF A PROCESSOR CORE ELECTRICALLY COUPLED DIRECTLY TO A POWER SOURCE AND RELATED METHODS

BACKGROUND

I. Field of the Disclosure

The technology of the disclosure relates generally to power management in a multi-core processor and, more particularly, to improving performance while reducing power consumption in idle cores in a cluster in a multi-core processor.

II. Background

In a multi-core processor, a scheduler determines which core will be assigned to execute a particular task. That determination may depend on the capability of a core to complete the task. If there are no additional tasks or no tasks that are appropriate for an available core, that core will be in an idle state. Even though circuits in the idle cores may not be switching due to clock gating, they may still be consuming power as a result of leakage currents. Efforts to reduce power consumption due to leakage currents in processor cores include the use of localized power switches distributed around the surface of a die, with each power switch being used to cut off power to a region of circuits. In this manner, power consumption can be reduced in circuits of a core that is temporarily idle. One drawback of using such power switches is the area they occupy and the congestion they cause in one or more metal layers. Another drawback is a drop in the supply voltage of approximately three percent (3%) from the power rail side to the circuit side of each power switch. This drop in voltage adds to the total power consumption of a die and also causes a reduction in performance, which frustrates efforts to increase core operating frequencies.

SUMMARY

Aspects disclosed in the detailed description include a processor cluster configured to maximize utilization of a processor core electrically coupled directly to a power source. Related methods of a scheduler are also disclosed. An exemplary processor cluster includes a first processor core electrically coupled directly to a power rail and a second processor core coupled to the power rail through power switches. The first processor core consumes power due to leakage currents during idle states. In contrast, the second processor core is electrically decoupled from the power rail by the power switches during idle states to reduce power consumption. However, the supply voltage to the second processor core decreases through the power switches, causing degraded performance compared to the first processor core. The processor cluster includes a scheduler configured to assign tasks to the first processor core and the second processor core in a manner that optimizes the balance between power consumption and performance. As an example, at startup, a supply voltage provided to the power rail turns on the first processor core first while the second processor core remains turned off. As activity increases and the second processor core is needed for performance reasons, the power switches are turned on to provide power to the second processor core and tasks are assigned to the second processor core. Subsequently, as activity decreases, power to the second processor core is turned off to save power while tasks continue to be assigned to the first processor core. In some examples, the second processor core has a lower-performance core type, and even though a task may indicate that it can be executed on the lower-performance core type, the task is assigned to the first processor core while the second processor core is turned off to maximize performance with minimal power consumption.

In this regard, in one exemplary aspect, an integrated circuit (IC) is disclosed. The IC includes a first power rail and a processor cluster circuit, including a plurality of processor cores. The plurality of processor cores includes a first processor core electrically coupled directly to the first power rail, a first plurality of power switches electrically coupled to the first power rail, and a second processor core electrically coupled to the first plurality of power switches. The processor cluster circuit is configured to provide a supply voltage to the first power rail, control the first plurality of power switches to electrically decouple the second processor core from the first power rail, and assign a first task for execution to the first processor core.

In another exemplary aspect, a processor cluster is disclosed. The processor cluster includes a first processor core electrically coupled directly to a first power rail, a first plurality of power switches electrically coupled to the first power rail, and a second processor core electrically coupled to the first plurality of power switches. The processor cluster is configured to, in response to the first power rail receiving a supply voltage and the second processor core electrically decoupled from the first power rail, assign a first task of the tasks to the first processor core.

In another exemplary aspect, a method in a processor cluster including a first processor core electrically coupled to a first power rail, a first plurality of power switches electrically coupled to the first power rail, and a second processor core electrically coupled to the first plurality of power switches is disclosed. The method includes providing a supply voltage to the first power rail, controlling the first plurality of power switches to electrically decouple the second processor core from the first power rail, and assigning a first task for execution to the first processor core.

BRIEF DESCRIPTION OF THE DRAWINGS

FIG. 5 is a flowchart of a method of the processor cluster of FIG. 3 to assign tasks to the first processor core and electrically decouple a second processor core from a power rail;

DETAILED DESCRIPTION

Figure 1:
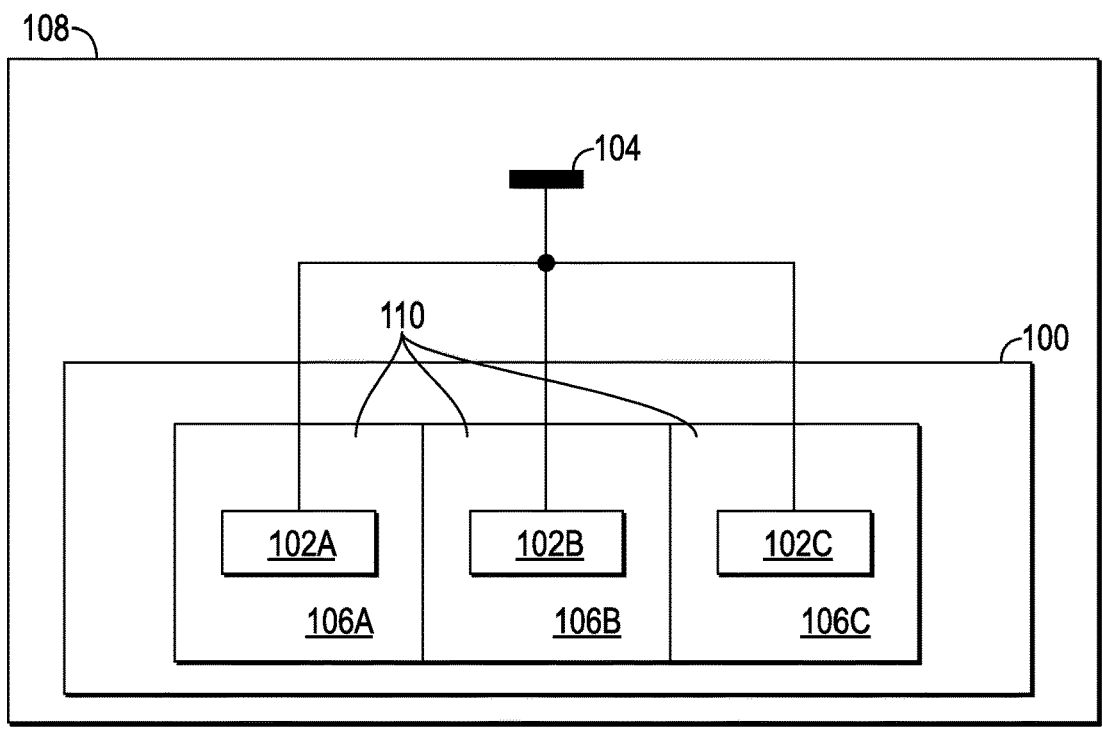
FIG. 1 is a schematic diagram of a processor core circuit comprising power-switched circuits disposed in regions of a die and power switches disposed in the regions to electrically decouple the circuits therein from a power rail in an idle state to reduce power consumption due to leakage currents.

Several exemplary aspects of the present disclosure are described in reference to the drawing figures. The word "exemplary" is used herein to mean "serving as an example, instance, or illustration." Any aspect described herein as "exemplary" is not necessarily to be construed as preferred or advantageous over other aspects.

Aspects disclosed in the detailed description include a processor cluster configured to maximize utilization of a processor core electrically coupled directly to a power source. Related methods of a scheduler are also disclosed. An exemplary processor cluster includes a first processor core electrically coupled directly to a power rail and a second processor core coupled to the power rail through power switches. The first processor core consumes power due to leakage currents during idle states. In contrast, the second processor core is electrically decoupled from the power rail by the power switches during idle states to reduce power consumption. However, the supply voltage to the second processor core decreases through the power switches, causing degraded performance compared to the first processor core. The processor cluster includes a scheduler configured to assign tasks to the first processor core and the second processor core to optimize the balance between power consumption and performance. As an example, at startup, a supply voltage provided to the power rail turns on the first processor core first while the second processor core remains turned off. As activity increases, and the second processor core is needed for performance reasons, the power switches are turned on to provide power to the second processor. Subsequently, as activity decreases, power to the second processor core is turned off to save power while tasks continue to be assigned to the first processor core. In some examples, the second processor core has a lower-performance core type, and even though a task may indicate that it can be executed on the lower-performance core type, the task is assigned to the first processor core while the second processor core is turned off to maximize performance with minimal power consumption.

FIG. 1 is a schematic diagram of a processor core circuit ("processor core") 100 electrically coupled to a power rail 104 by power switches 102A, 102B, and 102C. The power switches 102A, 102B, and 102C may be employed in an idle state (e.g., an inactive state) of the processor core 100 to decouple the processor core 100 from the power rail 104.

The processor core 100 may be referred to herein as a "power-switched" processor core because power (e.g., a supply voltage V$_{DD}$) provided to the processor core 100 may be turned on or off by the power switches 102A, 102B, and 102C. The power switches 102A, 102B, and 102C are disposed in respective circuit regions 106A, 106B, and 106C of a die 108 (e.g., a semiconductor die). The circuit regions 106A, 106B, and 106C are regions in which circuits 110 of the processor core 100 are disposed on the die 108. The power switches 102A, 102B, and 102C occupy portions of a metal layer (e.g., routing layer, not shown) above the die 108, which can interfere with the routing of signals at and below those portions of the metal layer. The circuits 110 may include digital logic circuits that may change state periodically and at a high frequency in response to a system clock. The circuits 110 are electrically coupled to the power rail 104 and receive power when the power switches 102A, 102B, and 102C are turned on (i.e., closed to allow current flow). When the power switches 102A, 102B, and 102C are turned off (e.g., opened), the circuits 110 are electrically decoupled from the power rail 104.

The processor core 100 is configured to execute tasks, causing circuit switching activity in the circuits 110. Power is consumed in the processor core 100 during circuit switching. When there are no tasks being executed in the processor core 100, such as during an idle state, power consumption in the circuits 110 can be stopped by turning off the supply voltage V$_{DD}$ provided to the power rail 104. Power consumption in the processor core 100 can also be stopped by turning off (i.e., opening) the power switches 102A, 102B, and 102C to electrically decouple the processor core 100 from the power rail 104.

The power switches 102A, 102B, and 102C are employed in the circuit regions 106A, 106B, and 106C to reduce or avoid power consumption caused by leakage currents through the circuits 110 during idle states (in the absence of circuit switching) in the processor core 100. An example of a leakage current is current that flows between the drain and the source of a field effect transistor (FET) when the channel of the FET is turned off (which depends on a voltage applied to a gate of the FET). However, including the power switches 102A, 102B, and 102C causes a reduction in performance in the processor core 100 due to a drop in the supply voltage V$_{DD}$ through the power switches 102A, 102B, and 102C. That is, there is a reduction (e.g., about three percent (3%)) in the voltage supply voltage V$_{DD}$ from the power rail 104 to the circuits 110 due to the power switches 102A, 102B, and 102C. The reduction may be due to a resistance or impedance of the power switches 102A, 102B, and 102C. Accordingly, the performance (e.g., operating frequency) of the processor core 100, which is voltage-dependent, may be reduced due to the presence of the power switches 102A, 102B, and 102C.

Figure 2:
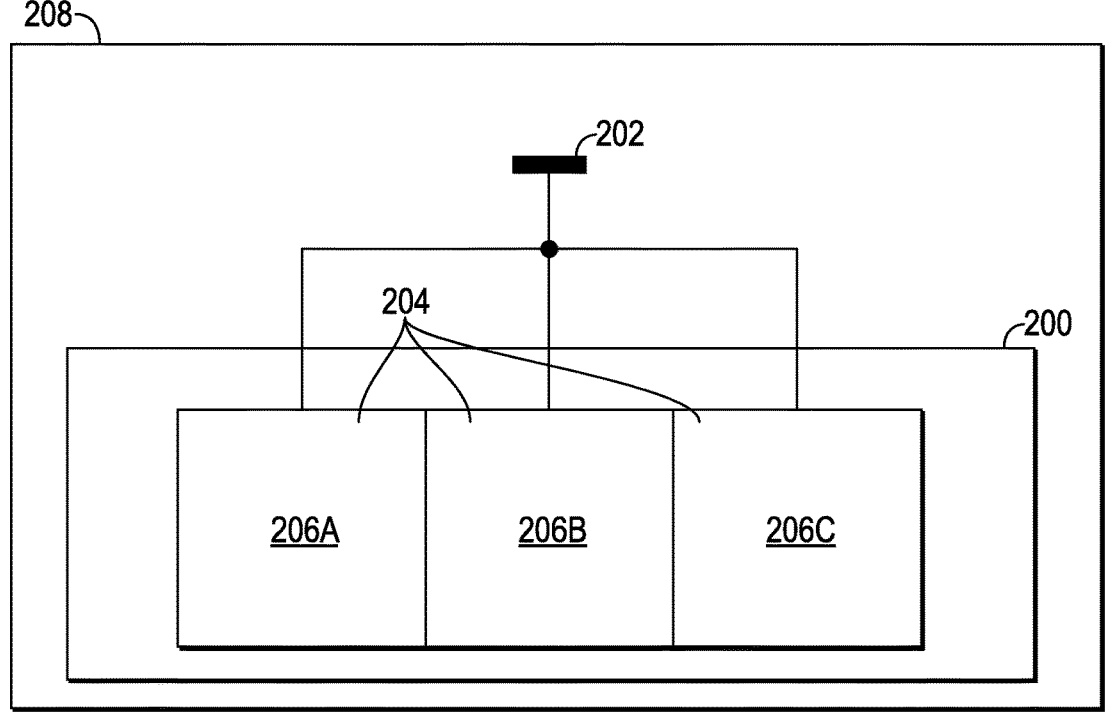
FIG. 2 is a schematic diagram of a processor core circuit comprising unswitched circuits in the regions of a die without power switches to electrically decouple the circuits from the power rail, allowing leakage current in an idle state but increasing performance.

FIG. 2 is a schematic diagram of a processor core 200 that is electrically coupled to a power rail 202 without power switches. The processor core 200 may be directly coupled to the power rail 202. In this regard, the processor core 200 may be referred to herein as an "unswitched" processor core because there are no power switches that can be used to prevent a supply voltage V$_{DD}$ on the power rail 202 from being provided to the processor core 200. Thus, the supply voltage V$_{DD}$ is provided to the processor core 200 and, more particularly, to circuits 204 of the processor core 200 in circuit regions 206A, 206B, and 206C even when the processor core 200 is in an idle state. The circuit regions 206A, 206B, and 206C are regions of a die 208 and have less routing congestion than the circuit regions 106A, 106B, and 106C in FIG. 1 due to the absence of any power switches. When the supply voltage $V_{DD}$ is being provided to the power rail 202 and the processor core 200 is in an inactive or idle state (e.g., not executing a task), the processor core 200 consumes power by way of leakage currents through the circuits 204. However, performance of the processor core 200 is improved in comparison to the processor core 100 because the supply voltage $V_{DD}$ is not reduced by the presence of power switches.

Figure 3:
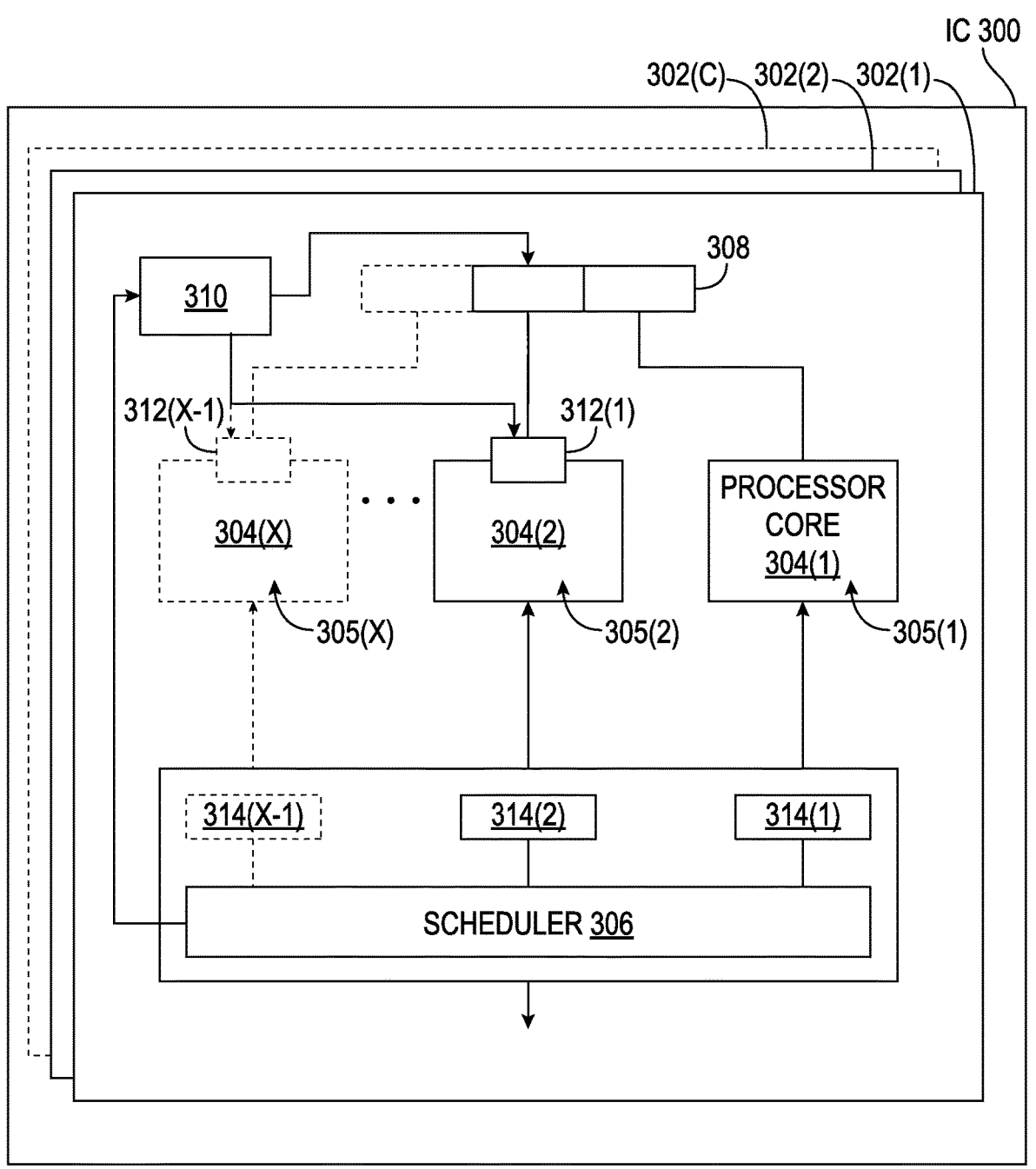
FIG. 3 is a schematic diagram of an exemplary integrated circuit (IC) comprising processor clusters, including processor core circuits in which a first processor core is coupled to a power rail without a power switch to improve performance, and at least a second processor core includes a power switch to reduce power consumption during idle states.

FIG. 3 is a schematic diagram of an integrated circuit (IC) 300 including a processor cluster circuit 302(1) and optionally one or more additional processor cluster circuits 302(2)-302(C). The processor cluster circuit 302(1) includes a plurality of processor core circuits 304(1)-304(X) ("processor cores 304(1)-304(X)") that execute tasks assigned by a scheduler 306 in the processor cluster circuit 302(1). In this regard, the processor cores 304(1)-304(X) include circuits 305(1)-305(X), respectively. The circuits 305(1)-305(X) of the processor cores 304(1)-304(X) receive a supply voltage $V_{DD}$ to provide power to allow the circuits to switch states while executing the tasks. The tasks include sets of software instructions that may perform threads of processes and the processes may be associated with, for example, a user application on a device containing the IC 300. Typically, in such examples, there may be times in which processes of the application are not running, which may cause some or all of the processor cores 304(1)-304(X) to have no tasks to run and, therefore, be in an idle state. When one of the processor cores 304(1)-304(X) is in an idle state, not executing tasks, the corresponding circuits 305(1)-305(X) become inactive and do not require power.

Each of the processor cores 304(1)-304(X) may be electrically coupled to a power rail 308 configured to provide the supply voltage $V_{DD}$. The processor cluster circuit 302(1) also includes a power control circuit 310 that may determine and control whether the supply voltage $V_{DD}$ is provided to the power rail 308. The power control circuit 310 selectively provides the supply voltage $V_{DD}$ to the power rail 308. In addition, the processor cluster circuit 302(1) includes power switches 312(1)-312(X-1) to selectively couple the processor cores 304(2)-304(X) to the power rail 308. In this regard, the processor cores 304(2)-304(X) are referred to herein as "power-switched" cores. In more detail, the processor cores 304(2)-304(X) are electrically coupled to the power switches 312(1)-312(X-1), respectively, and the power switches 312(1)-312(X-1) are electrically coupled to the power rail. As noted with regard to FIG. 2, each of the processor cores includes multiple power switches. Thus, the processor core 304(2) is electrically coupled to the power switches 312(1), which are electrically coupled to the power rail 308, and the processor core 304(X) is electrically coupled to the power switches 312(X-1), which are electrically coupled to the power rail 308.

The power control circuit 310 may control the power switches 312(1)-312(X-1) individually to "turn on" or close to electrically couple one or more of the processor cores 304(2)-304(X) to the power rail 308. The power control circuit 310 may control other ones of the power switches 312(1)-312(X-1) individually to "turn off" or open to electrically decouple the processor cores 304(2)-304(X) from the power rail 308. Thus, the power control circuit 310 controls, in two ways, whether the supply voltage $V_{DD}$ provided to the processor cores 304(2)-304(X) may be turned off. First, the power control circuit 310 may turn off or stop the supply voltage $V_{DD}$ provided to the power rail 308. Second, even when the supply voltage $V_{DD}$ is provided to the power rail 308, the power control circuit 310 may stop power to the processor cores 304(2)-304(X) by turning off the power switches 312(1)-312(X-1). As noted above, however, the supply voltage $V_{DD}$ is diminished or reduced through the power switches 312(1)-312(X-1), causing reduced performance in the processor cores 304(2)-304(X).

In contrast, the processor core 304(1) is coupled to the power rail 308 without an intervening switch. In this regard, the processor core 304(1) is referred to as an "unswitched" core. Thus, the processor core 304(1) may be directly coupled to the power rail 308 and, therefore, is configured to receive the supply voltage $V_{DD}$ without any voltage reduction, which may allow the processor core 304(1) to operate at a higher frequency than the processor cores 304(2)-304(X). However, processor core 304(1) may not be electrically decoupled from the power rail 308 during an idle state and will continue to consume power due to leakage currents, unless the power control circuit 310 turns off power to the power rail 308, as described above.

To minimize power consumption due to idle states of the processor core 304(1) while maximizing performance of the processor cluster circuit 302(1), the processor cluster circuit 302(1) is configured to employ the scheduler 306 in conjunction with the power control circuit 310 to assign tasks to the processor core 304(1) first, when the processor cluster circuit 302(1) begins to execute processes after being previously inactive, and also last, as activity in the processor cluster circuit 302(1) decreases down to a single task, for example. Stated differently, in the example in FIG. 3 in which the processor cluster circuit 302(1) includes the processor cores 304(1) and 304(2), the processor cluster circuit 302(1) is configured to provide the supply voltage $V_{DD}$ to the power rail 308, control the power switches 312(1) to electrically decouple the processor core 304(2) from the power rail 308, and assign a task to the processor core 304(1).

The processor cluster circuit 302(1) also includes task queues 314(1)-314(X), which are associated with the processor cores 304(1)-304(X), respectively. When the scheduler 306 assigns tasks to the processor cores 304(1) and 304(2), the tasks may be stored in the task queues 314(1)-314(2) and provided to the corresponding one of the processor cores 304(1) and 304(2) as needed. In particular, the task queue 314(1) is configured to store the tasks assigned to the processor core 304(1) and the task queue 314(2) is configured to store the tasks assigned to the processor core 304(2). Tasks being executed are removed from the task queues 314(1)-314(2). The task queues 314(1)-314(2) may employ an algorithm, such as first-in-first-out (FIFO), or there may be a prioritization scheme to determine an order of tasks provided to the processor cores 304(1) and 304(2) from among the tasks stored in the task queues 314(1)-314(2). When there are no more tasks stored in one of the task queues 314(1) and 314(2), the corresponding one of the processor cores 304(1) and 304(2) may enter an idle state. In some examples, when the task queue 314(1) is empty and the task queue 314(2) stores one or more tasks, the task(s) may be removed from the task queue 314(2) and assigned to the processor core 304(1).

In another aspect, the processor core 304(1) and the processor core 304(2) may be of different core types, where different core types have different performance levels. Performance level differences may be due to, for example, different cache sizes and/or different (e.g., faster) circuit implementations. A core type having a higher performance level completes execution of certain tasks more quickly or efficiently than core types having a lower performance level. As noted, the processor core 304(1) is employed first and last (e.g., most often) among the processor cores 304(1)-304(X) and may operate at a higher frequency than the processor cores 304(2)-304(X). Additionally, to maximize performance of the processor cluster circuit 302(1), the processor core 304(1) may be a highest performance core type. In some examples, the processor cores 304(2)-304(X) may be of a same core type as the processor core 304(1). In some examples, one or more of the processor cores 304(2)-304(X) may be of another core type having a lower performance level than the processor core 304(1). In either of the above examples, to maximize performance and minimize power consumption due to leakage currents, in response to the plurality of power switches 312(1) electrically coupling the processor core 304(2) to the power rail 308, and there are no tasks stored in the task queue 314(1) and the task queue 314(2), the scheduler 306 is configured to assign a task (e.g., a new task) to the first processor core.

In this regard, tasks may be assigned to the processor cores 304(1)-304(X) according to a core type having a particular performance level. For example, in an example in which there are core types of multiple performance levels within the processor cluster circuit 302(1), a task may include an indication of a minimum performance level of a core that should be assigned the task. In some examples, the indication of a minimum performance level is an indication of a particular core type. However, to maximize performance while minimizing power consumption in such example, the scheduler 306 may ignore the indication of minimum performance level for a task and assign the task to the processor core 304(1) instead of activating an inactive one of the processor cores 304(2)-304(X) that has the core type designated by the task, especially if the processor core 304(1) has no remaining tasks stored in the task queue 314(1).

In some of the above examples, a task indicating a minimum performance level lower than a high performance level of the processor core 304(1) may be assigned to the processor core 304(1) to keep the processor core 304(1) active, as opposed to activating (e.g., turning on) an inactive processor core 304(2) with the lower performance core type indicated by the task, as this would allow the processor core 304(1) to remain idle and consume power unnecessarily. In another example, in which the processor core 304(2), having the lower performance type, is already active, the task may be assigned to the processor core 304(1), and the power control circuit 310 will control the power switches 312(1) to electrically decouple the processor core 304(2) from the power rail 308. In still other examples, with no tasks stored in the task queue 314(1) of the processor core 304(1) but a task stored in the task queue 314(2), the scheduler 306 is configured to move the task from the task queue 314(2) to the task queue 314(1), to assign the task to the unswitched processor core 304(1).

Figure 4:
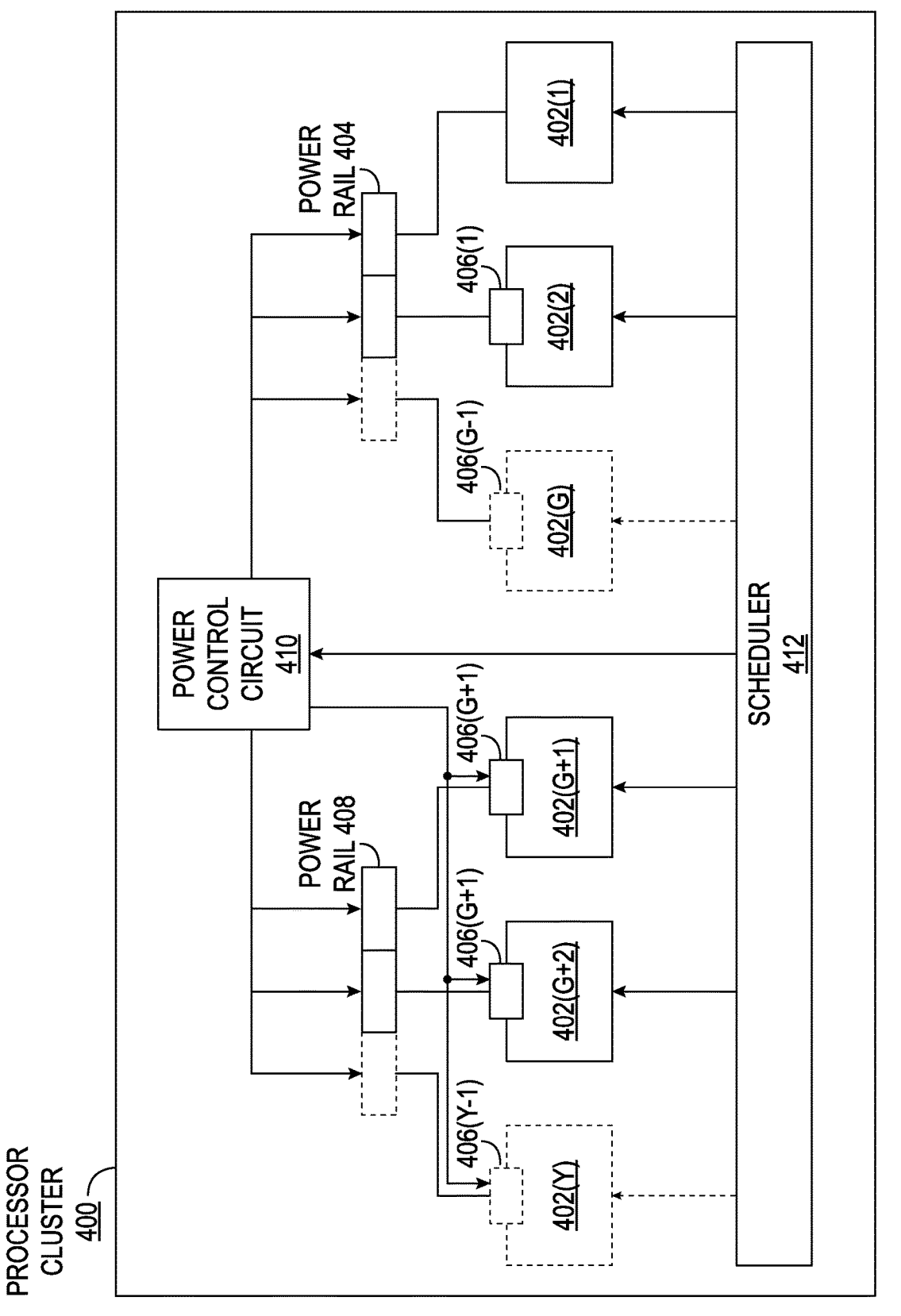
FIG. 4 is a schematic diagram of an exemplary processor cluster circuit comprising a first processor core and at least a second processor core coupled to a first power rail and additional processor core circuits coupled to a second power rail, where the additional processor core circuits each comprise a core type having a lower performance level than the first processor core and the at least a second processor core.

FIG. 4 is an example of a processor cluster 400, including processor cores 402(1)-402(Y). The processor core 402(1) has a core type having a highest performance level and is coupled to a power rail 404 without power switches (e.g., unswitched). One or more processor cores 402(2)-402(G) of the processor cores 402(2)-402(Y) may have a same core type as the processor core 402(1) or a second core type having a second (e.g., lower) performance level. The processor cores 402(2)-402(G) are coupled to the power rail 404 by power switches 406(1)-406(G−1). The processor cores 402(G+1)-402(Y) may be of a third core type having a third performance level lower than the second performance level. The processor cores 402(G+1)-402(Y) are electrically coupled to a second power rail 408 by power switches

406(G)-406(Y−1). Under control of a power control circuit 410, the first power rail 404 and the second power rail 408 may be provided the supply voltage $V_{DD}$ independent of each other. Thus, the second power rail 408 may be turned off while the supply voltage $V_{DD}$ is provided to the first power rail 404.

Tasks may be assigned to the processor cores 402(1)-402(Y) by a scheduler 412, which may be the scheduler 306 in FIG. 3. The processor cores 402(G+1)-402(Y), having the third core type, may be turned on to provide tasks that require a lower performance level. As an example, one or more of the processor cores 402(G+1)-402(Y) may perform the functions of the scheduler 412, including assigning tasks to the first task queue and the second task queue. In other examples, functions of the scheduler 412 are performed by a circuit separate from the processor cores 402(1)-402(Y).

FIG. 5 is a flowchart of a method 500 in a processor cluster circuit 302(1) comprising a first processor core 304(1) electrically coupled to a first power rail 308, a first plurality of power switches 312(1) electrically coupled to the first power rail 308, and a second processor core 304(2) electrically coupled to the first plurality of power switches 312(1) (block 502), the method comprising providing a supply voltage $V_{DD}$ to the first power rail 308(block 504), controlling the first plurality of power switches 312(1) to electrically decouple the second processor core 304(2) from the first power rail 308 (block 506), and assigning a first task for execution to the first processor core 304(1) (block 508).

Electronic devices according to any aspects disclosed herein may be provided in or integrated into any processor-based device. Examples, without limitation, include a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, laptop computer, a wearable computing device (e.g., a smartwatch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
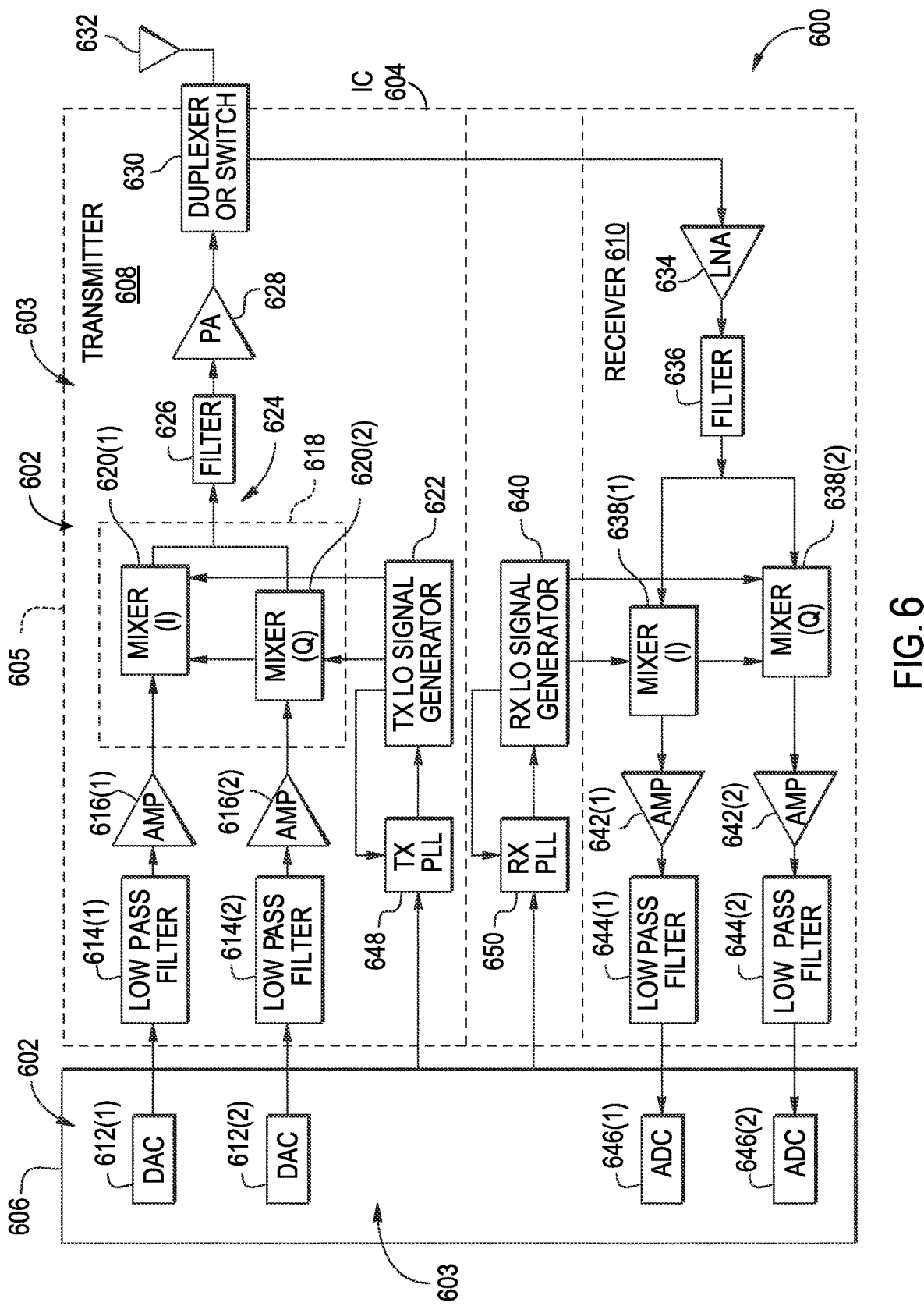
FIG. 6 is a block diagram of an exemplary wireless communication device that includes an IC comprising processor clusters including processor core circuits in which a first task is assigned to a first processor core while a second processor core is decoupled from a power rail as shown in FIGS. 3 and 4 and according to, but not limited to, the exemplary method in FIG. 5.

In this regard, FIG. 6 illustrates a block diagram of an exemplary wireless communications device 600 that includes radio frequency (RF) components formed from one or more ICs 602, wherein any of the ICs 602 can include an integrated circuit (IC) comprising clusters of processor circuits and employing power circuits to control a power source to reduce a supply voltage provided in a zero-load current ("no-load") condition to reduce power consumption as illustrated in FIGS. 1, 3, and 4, and according to the process in FIG. 5. The wireless communications device 600 may include or be provided as examples in any of the above-referenced devices. As shown in FIG. 6, the wireless communications device 600 includes a transceiver 604 and a data processor 606. The data processor 606 may include a memory to store data and program codes. The transceiver 604 includes a transmitter 608 and a receiver 610, which support bi-directional communications. In general, the wireless communications device 600 may include any number of transmitters 608 and/or receivers 610 for any number of communication systems and frequency bands. All or a portion of the transceiver 604 may be implemented on one or more analog ICs, RF ICs (RFICs), mixed-signal ICs, etc.

The transmitter 608 or the receiver 610 may be implemented with a super-heterodyne or direct-conversion architecture. In the super-heterodyne architecture, a signal is frequency-converted between RF and baseband in multiple stages, e.g., from RF to an intermediate frequency (IF) in one stage and then from IF to baseband in another stage. In the direct-conversion architecture, a signal is frequency-converted between RF and baseband in one stage. The super-heterodyne and direct-conversion architectures may use different circuit blocks and/or have different requirements. In the wireless communications device 600 in FIG. 6, the transmitter 608 and the receiver 610 are implemented with the direct-conversion architecture.

In the transmit path, the data processor 606 processes data to be transmitted and provides I and Q analog output signals to the transmitter 608. In the exemplary wireless communications device 600, the data processor 606 includes digital-to-analog converters (DACs) 612(1), 612(2) for converting digital signals generated by the data processor 606 into I and Q analog output signals, e.g., I and Q output currents, for further processing.

Within the transmitter 608, lowpass filters 614(1), 614(2) filter the I and Q analog output signals, respectively, to remove undesired signals caused by the prior digital-to-analog conversion. Amplifiers (AMPs) 616(1), 616(2) amplify the signals from the lowpass filters 614(1), 614(2), respectively, and provide I and Q baseband signals. An upconverter 618 upconverts the I and Q baseband signals with I and Q transmit (TX) local oscillator (LO) signals from a TX LO signal generator 622 through mixers 620(1), 620(2) to provide an upconverted signal 624. A filter 626 filters the upconverted signal 624 to remove undesired signals caused by the frequency upconversion and noise in a receive frequency band. A power amplifier (PA) 628 amplifies the upconverted signal 624 from the filter 626 to obtain the desired output power level and provides a transmit RF signal. The transmit RF signal is routed through a duplexer or switch 630 and transmitted via an antenna 632.

In the receive path, the antenna 632 receives signals transmitted by base stations and provides a received RF signal, which is routed through the duplexer or switch 630 and provided to a low noise amplifier (LNA) 634. The duplexer or switch 630 is designed to operate with a specific receive (RX)-to-TX duplexer frequency separation, such that RX signals are isolated from TX signals. The received RF signal is amplified by the LNA 634 and filtered by a filter 636 to obtain a desired RF input signal. Downconversion mixers 638(1), 638(2) mix the output of the filter 636 with I and Q RX LO signals (i.e., LO_I and LO_Q) from an RX LO signal generator 640 to generate I and Q baseband signals. The I and Q baseband signals are amplified by AMPs 642(1), 642(2) and further filtered by lowpass filters 644(1), 644(2) to obtain I and Q analog input signals, which are provided to the data processor 606. In this example, the data processor 606 includes analog-to-digital converters (ADCs) 646(1), 646(2) for converting the analog input signals into digital signals to be further processed by the data processor 606.

In the wireless communications device 600 of FIG. 6, the TX LO signal generator 622 generates the I and Q TX LO signals used for frequency upconversion, while the RX LO signal generator 640 generates the I and Q RX LO signals used for frequency downconversion. Each LO signal is a periodic signal with a particular fundamental frequency. A TX phase-locked loop (PLL) circuit 648 receives timing information from the data processor 606 and generates a control signal used to adjust the frequency and/or phase of the TX LO signals from the TX LO signal generator 622. Similarly, an RX PLL circuit 650 receives timing information from the data processor 606 and generates a control signal used to adjust the frequency and/or phase of the RX LO signals from the RX LO signal generator 640.

Figure 7:
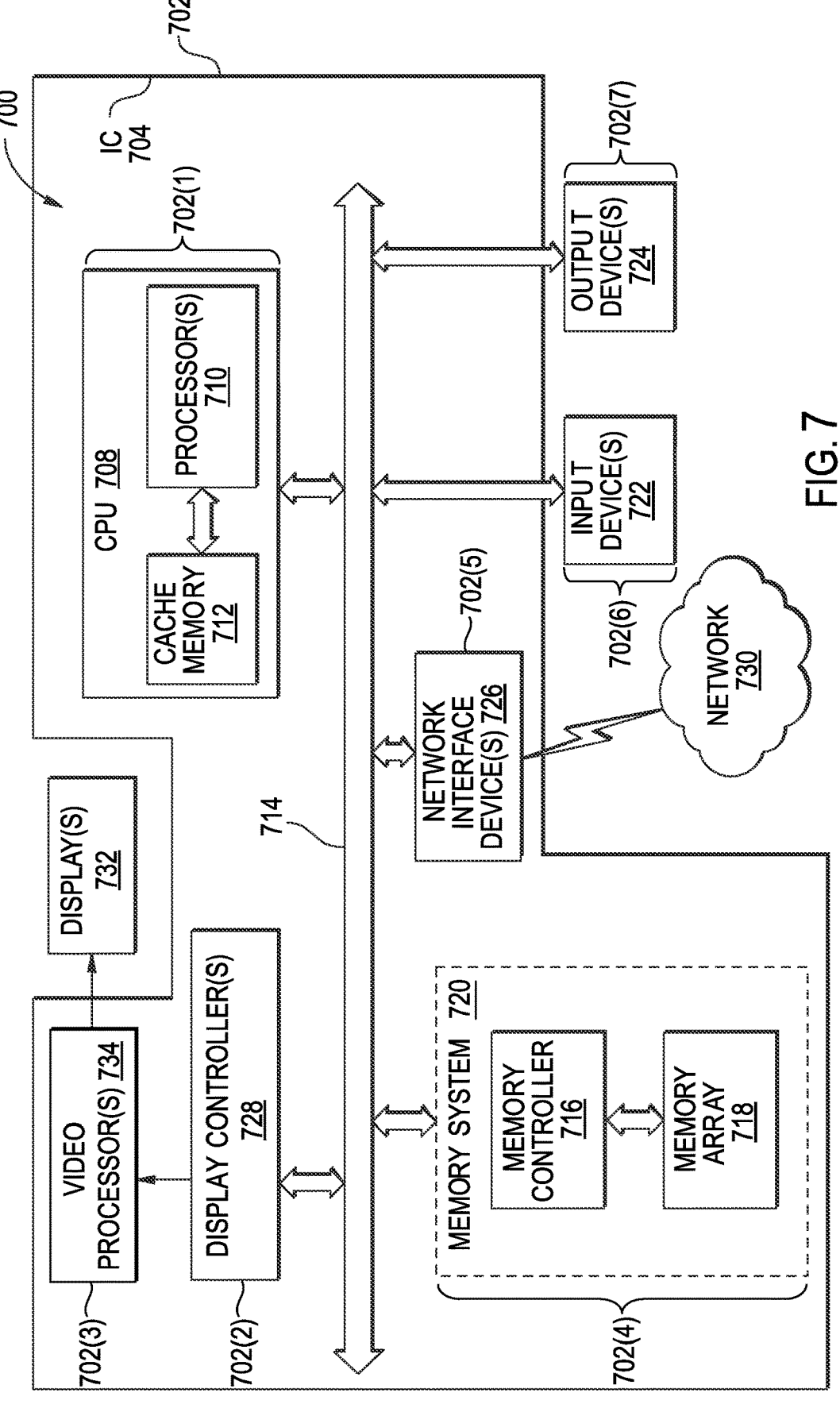
FIG. 7 is a block diagram of an exemplary processor-based system that can include an IC comprising processor clusters including processor core circuits in which a first task is assigned to a first processor core while a second processor core is decoupled from a power rail as shown in FIGS. 3 and 4 and according to, but not limited to the exemplary method in FIG. 5.

FIG. 7 illustrates a block diagram of an example of a processor-based system 700 that can employ integrated circuits, including an integrated circuit (IC) comprising clusters of processor circuits and employing power circuits to control a power source to reduce a supply voltage provided in a zero-load current ("no-load") condition to reduce power consumption as illustrated in FIGS. 1, 3, and 4, and according to the exemplary process in FIG. 5. In this example, the processor-based system 700 includes a processor 702 that includes an IC 704 including one or more central processor units (CPUs) 708, which may also be referred to as CPU or processor cores, each including one or more processors 710. The CPU(s) 708 may have cache memory 712 coupled to the processor(s) 702 for rapid access to temporarily stored data. The CPU(s) 708 is coupled to a system bus 714 and can intercouple master and slave devices included in the processor-based system 700. As is well known, the CPU(s) 708 communicates with these other devices by exchanging address, control, and data information over the system bus 714. For example, the CPU(s) 708 can communicate bus transaction requests to a memory controller 716 as an example of a slave device. Although not illustrated in FIG. 7, multiple system buses 714 could be provided wherein each system bus 714 constitutes a different fabric.

Other master and slave devices can be connected to the system bus 714. As illustrated in FIG. 7, these devices can include a memory system 720 that includes the memory controller 716 and one or more memory arrays 718, one or more input devices 722, one or more output devices 724, one or more network interface devices 726, and one or more display controllers 728, as examples. The input device(s) 722 can include any type of input device, including, but not limited to, input keys, switches, voice processors, etc. The output device(s) 718 can include any type of output device, including, but not limited to, audio, video, other visual indicators, etc. The network interface device(s) 726 can be any device configured to allow an exchange of data to and from a network 730. The network 730 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 726 can be configured to support any type of communications protocol desired.

The CPU(s) 708 may also be configured to access the display controller(s) 728 over the system bus 714 to control information sent to one or more displays 732. The display controller(s) 728 sends information to the display(s) 732 to be displayed via one or more video processors 734, which process the information to be displayed into a format suitable for the display(s) 732. The display(s) 732 can include any type of display, including, but not limited to, a cathode ray tube (CRT), a liquid crystal display (LCD), a plasma display, or a light-emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium wherein any such instructions are executed by a processor or other processing device, or combinations of both. As examples, the devices and components described herein may be employed in any circuit, hardware component, integrated circuit (IC), or IC chip. Memory disclosed herein may be any type and size of memory and may be configured to store any desired information. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. Alternatively, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using various technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Implementation examples are described in the following numbered clauses:

1. An integrated circuit (IC) comprising:
   a first power rail; and
   a processor cluster circuit comprising:
      a plurality of processor cores, comprising:
         a first processor core electrically coupled directly to the first power rail;
         a first plurality of power switches electrically coupled to the first power rail; and
         a second processor core electrically coupled to the first plurality of power switches;
      wherein the processor cluster circuit is configured to:
         provide a supply voltage to the first power rail;
         control the first plurality of power switches to electrically decouple the second processor core from the first power rail; and
         assign a first task for execution to the first processor core.
2. The IC of clause 1, further comprising:
   a first task queue configured to store tasks assigned to the first processor core; and
   a second task queue configured to store tasks assigned to the second processor core.
3. The IC of clause 1 or clause 2, wherein:
   the first processor core comprises a first core type having a first performance level; and
   the second processor core comprises the first core type.
4. The IC of clause 1 or clause 2, wherein:
   the first processor core comprises a first core type having a first performance level; and
   the second processor core comprises a second core type having a second performance level,
   wherein the first performance level is higher than the second performance level.
5. The IC of any of clause 1 to clause 4, wherein the processor cluster circuit is further configured to:
   control the first plurality of power switches to electrically couple the second processor core to the first power rail; and
   in response to having no tasks in the first task queue and the second task queue, assign a second task of the received tasks to the first processor core.
6. The IC of any of clause 2 to clause 5, wherein:
   each of the tasks comprises an indication of a minimum performance level; and
   the processor cluster circuit is further configured to, in response to having no tasks stored in the first task queue and the second task queue and having the second processor core electrically coupled to the first power rail, assign a second task comprising the indication of a minimum performance level corresponding to the second performance level to the first processor core.

7. The IC of any of clause 1 to clause 6, wherein the processor cluster circuit is further configured to control the first plurality of power switches to electrically decouple the second processor core from the first power rail.

8. The IC of any of clause 1 to clause 7, wherein:
the second processor core comprises a plurality of circuits disposed on a region of a die; and
the first plurality of power switches occupies portions of a metal layer above the die in the region.

9. The IC of any of clause 1 to clause 8, the plurality of processor cores further comprises a third processor core electrically coupled to a second plurality of power switches each electrically coupled to the first power rail.

10. The IC of any of clause 4 to clause 9, the plurality of processor cores further comprises a third processor core of the second core type electrically coupled to a second plurality of power switches each electrically coupled to the first power rail.

11. The IC of any of clause 4 to clause 10, wherein:
the plurality of processor cores further comprises at least a third processor core of a third core type electrically coupled to a third plurality of power switches electrically coupled to a second power rail; and
each of the at least a third processor cores has a third performance level lower than the second performance level.

12. The IC of any of clause 2 to clause 11, wherein the plurality of processor cores is further configured to, in response to having no tasks stored in the first task queue and a second task stored in the second task queue, move the second task to the first task queue.

13. The IC of clause 11 or clause 12, wherein the at least a third processor core is configured to execute a function of a scheduler to assign the tasks to the first task queue and the second task queue.

14. The IC of any of clause 1 to clause 13 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.

15. A processor cluster comprising:
a first processor core electrically coupled to a first power rail;
a first plurality of power switches electrically coupled to the first power rail; and
a second processor core electrically coupled to the first plurality of power switches;
wherein the processor cluster is configured to, in response to the first power rail receiving a supply voltage and the second processor core electrically decoupled from the first power rail, assign a first task of the tasks to the first processor core.

16. The processor cluster of clause 15, wherein:
the first processor core is of a first core type having a first performance level; and
the second processor core is of a second core type having a second performance level;
wherein the first performance level is higher than the second performance level.

17. The processor cluster of clause 15 or clause 16, further comprising:
a first task queue configured to store tasks assigned to the first processor core; and
a second task queue configured to store tasks assigned to the second processor core;
wherein the processor cluster is further configured to, in response to the second processor core electrically coupled to the first power rail and no tasks stored in the first task queue and the second task queue, assign a second task of the tasks to the first processor core.

18. The processor cluster of clause 17, wherein the plurality of processor cores is further configured to, in response to a second task stored in the second task queue and no tasks stored in the first task queue, move the second task to the first task queue.

19. A method in a processor cluster comprising a first processor core electrically coupled to a first power rail, a first plurality of power switches electrically coupled to the first power rail, and a second processor core electrically coupled to the first plurality of power switches, the method comprising:
providing a supply voltage to the first power rail;
controlling the first plurality of power switches to electrically decouple the second processor core from the first power rail; and
assigning a first task for execution to the first processor core.

20. The method of clause 19, further comprising, in response to the second processor core electrically coupled to the first power rail and no tasks stored in the first task queue and the second task queue, assigning a second task to the first processor core.

What is claimed is:
1. An integrated circuit (IC) comprising:
a first power rail; and
a processor cluster circuit comprising:
a plurality of processor cores, comprising:
a first processor core electrically coupled directly to the first power rail;
a first power switch electrically coupled to the first power rail; and
a second processor core electrically coupled to the first power switch and configured to execute a first task;
wherein the processor cluster circuit is configured to:
provide a supply voltage to the first power rail;
control the first power switch to electrically decouple the second processor core from the first power rail; and
in response to the second processor core electrically decoupled from the first power rail, assign the first task to the first processor core for execution.

2. The IC of claim 1, further comprising:
a first task queue configured to store tasks assigned to the first processor core; and
a second task queue configured to store tasks assigned to the second processor core.

3. The IC of claim 1, wherein:

the first processor core comprises a first core type having a first performance level; and the second processor core comprises the first core type.

4. The IC of claim 2, wherein:

the first processor core comprises a first core type having a first performance level; and the second processor core comprises a second core type having a second performance level, wherein the first performance level is higher than the second performance level.

5. The IC of claim 4, wherein the processor cluster circuit is further configured to:

control the first power switch to electrically couple the second processor core to the first power rail; and in response to having no tasks stored in the first task queue and the second task queue, assign a second task to the first processor core.

6. The IC of claim 5, wherein:

the second task comprises an indication of a minimum performance level;

the second task is executable by the first processor core and by the second processor core; and the processor cluster circuit is further configured to, in response to having no tasks stored in the first task queue and the second task queue and having the second processor core electrically coupled to the first power rail, assign the second task comprising the indication of the minimum performance level to the first processor core.

7. The IC of claim 6, wherein the processor cluster circuit is further configured to control the first power switch to electrically decouple the second processor core from the first power rail.

8. The IC of claim 1, wherein:

the second processor core comprises a plurality of circuits disposed on a region of a die; and the first power switch occupies portions of a metal layer above the die in the region of the die.

9. The IC of claim 1, the plurality of processor cores further comprises a third processor core electrically coupled to a second power switch electrically coupled to the first power rail.

10. The IC of claim 4, the plurality of processor cores further comprises a third processor core of the second core type electrically coupled to a second power switch electrically coupled to the first power rail.

11. The IC of claim 4, wherein:

the plurality of processor cores further comprises at least a third processor core of a third core type electrically coupled to a second power switch electrically coupled to a second power rail; and the third processor core has a third performance level lower than the second performance level.

12. The IC of claim 2, wherein the plurality of processor cores is configured to, in response to having a second task stored in the second task queue and no tasks stored in the first task queue, move the second task to the first task queue.

13. The IC of claim 11, wherein the third processor core is configured to assign tasks to the plurality of processor cores in the processor cluster circuit.

14. The IC of claim 1 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP)

phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.

15. A processor cluster comprising:

a first processor core electrically coupled directly to a first power rail;

a first power switch electrically coupled to the first power rail; and a second processor core electrically coupled to the first power switch and configured to execute a first task;

wherein the processor cluster is configured to, in response to the first power rail receiving a supply voltage and the second processor core electrically decoupled from the first power rail, assign the first task to the first processor core.

16. The processor cluster of claim 15, wherein:

the first processor core is of a first core type having a first performance level; and the second processor core is of a second core type having a second performance level;

wherein the first performance level is higher than the second performance level.

17. The processor cluster of claim 15, further comprising:

a first task queue configured to store tasks assigned to the first processor core; and a second task queue configured to store tasks assigned to the second processor core;

wherein the processor cluster is further configured to, in response to the second processor core electrically coupled to the first power rail and no tasks stored in the first task queue and the second task queue, assign a second task to the first processor core.

18. The processor cluster of claim 15, wherein the processor cluster further comprises a scheduler circuit configured to, in response to having no tasks stored in a first task queue and having a second task stored in a second task queue, move the second task to the first task queue.

19. A method in a processor cluster comprising a first processor core electrically coupled to a first power rail, a first power switch electrically coupled to the first power rail, and a second processor core electrically coupled to the first power switch and configured to execute a first task, the method comprising:

providing a supply voltage from the first power rail to the first processor core through a direct connection between the first power rail and the first processor core;

controlling the first power switch to electrically decouple the second processor core from the first power rail; and in response to the second processor core electrically decoupled from the first power rail, assigning the first task to the first processor core for execution.

20. The method of claim 19, wherein:

the processor cluster further comprises:

a first task queue configured to store tasks assigned to the first processor core; and a second task queue configured to store tasks assigned to the second processor core; and the method further comprises, in response to the second processor core electrically coupled to the first power rail and no tasks stored in the first task queue and the second task queue, assigning a second task to the first processor core.

\* \* \* \* \*